United States Patent [19]

Brevick

[11] Patent Number: 5,429,508

[45] Date of Patent: Jul. 4, 1995

[54] AUTOMOBILE STEERING COLUMN INTERCONNECTOR

[75] Inventor: Arnold A. Brevick, Hamilton, Ill.

[73] Assignee: Methode Electronics, Inc., Chicago, Ill.

[21] Appl. No.: 186,531

[22] Filed: Jan. 26, 1994

[51] Int. Cl.⁶ .............................................. H01R 35/00
[52] U.S. Cl. ...................................... 439/15; 439/17; 439/19
[58] Field of Search .............................. 439/15, 18–22, 439/27, 29, 17, 516, 164

[56] References Cited

U.S. PATENT DOCUMENTS

| | | | |
|---|---|---|---|
| 4,090,667 | 5/1978 | Crimmins | 439/516 |
| 4,218,073 | 8/1980 | Cymbal | 439/15 |
| 4,310,174 | 1/1982 | Sundeen et al. | 280/731 |
| 4,372,633 | 2/1933 | Allen et al. | 439/17 |
| 4,592,606 | 6/1986 | Mudra | 439/516 |
| 4,650,266 | 3/1987 | Jacobson et al. | 439/21 |
| 4,689,023 | 8/1987 | Strong, III et al. | 439/516 |
| 4,722,690 | 2/1988 | Priede | 439/15 |
| 5,009,604 | 4/1991 | Plocek et al. | 439/15 |
| 5,061,195 | 10/1991 | Bolen | 439/164 |

Primary Examiner—Gary F. Paumen
Attorney, Agent, or Firm—Hill, Steadman & Simpson

[57] ABSTRACT

An interconnector electrically unites a rotatable air bag with a stationary air bag sensor. The interconnector has a hub rotatably associated with a housing to define a radial space including one or more complementary first and second electrically conductive rings. The rings are united with one or more connectors to complete the electrical pathway from the sensor to the air bag.

10 Claims, 4 Drawing Sheets

5,429,508

AUTOMOBILE STEERING COLUMN INTERCONNECTOR

BACKGROUND OF THE INVENTION

1. Field of the Invention

This invention relates generally to an automobile steering column interconnector. More specifically, the present invention relates to an automobile steering column interconnector that electrically unites a rotatable air bag assembly with a stationary sensor using one or more conductors that are simultaneously associated with the interconnector hub and housing. The conductors are preferably metallic rings that electrically unite a stationary interconnector housing with a rotatable interconnector hub.

An increasing number of automobiles have air bag crash systems. The air bag crash system typically includes an air bag located on the steering wheel facing the driver. The air bag must be in continuous electrical connection with one or more sensors in the car body. The sensors provide an electrical signal to the air bag crash assembly which instantly inflates the air bag in the event of a crash.

Accordingly, there is a need for an electrical connection between the rotatable portion of the air bag assembly which is mounted in the steering wheel and the sensors which are in a stationary position in the car body. Electrical connections between rotatable and stationary parts of a steering wheel are well known. Typically, a coiled electrical conductor, known as a clock spring, is united at one end to a stationary housing and at the other end to a rotatable hub. Rotation of the hub causes the coiled electrical conductor to tighten and to loosen much like a clock spring without jeopardizing the electrical connection.

There is a risk with the coiled electrical conductor that it will fail due to over rotation of the steering wheel or through overuse. As a result, elaborate methods are used to ensure that the clock spring interconnectors do not over rotate and that the interconnectors are installed in their proper initial orientation. These measures are costly and add additional parts to the clock spring devices which can fail.

2. Description of the Art

Automobile steering column interconnectors referred to as "clock springs" are well known in the art. Examples of automobile clock springs are shown in U.S. Pat. Nos. 5,061,195 and 4,722,690. Automobile clock spring interconnectors electrically unite a stationary sensor in a car body with an automobile air bag located in a steering wheel via a spirally wound coil of electrically conductive tape. An electrical signal from the sensor passes to the clock spring through the electrically conductive tape to actuate the air bag in the steering column.

Air bag interconnectors that do not use coiled conductive tape or wire windings to create an electrical pathway are also known in the art. For example, U.S. Pat. No. 5,009,604 describes an interconnector assembly that uses circular, resilient electrically conductive contact members to complete the electrical path between the interconnector housing and hub.

Finally, U.S. Pat. Nos. 4,650,266 and 4,372,633 disclose an apparatus useful in satellites for transferring high electrical currents. The apparatus disclosed in each of the patents includes a plurality of horizontal rolling rings that act in unison to transfer an electrical current from a rotatable element to a stationary element.

SUMMARY OF THE INVENTION

It is an object of the present invention to provide an automobile clock spring interconnector that unites a rotatable air bag with a stationary sensor without the use of a coiled conductive tape.

It is another object of the present invention to provide an automobile clock spring interconnector that uses multiple contact points to unite a rotatable air bag assembly with a stationary sensor.

It is yet another object of the present invention to provide an automobile clock spring interconnector that contains redundant contact points that electrically unite a stationary sensor to a rotatable air bag.

In one embodiment, the present invention provides a steering column interconnector. The steering column interconnector comprises a housing and a hub rotatably associated with the housing to create an annular enclosure having a central aperture. A first connector is associated with the housing while a second connector is associated with the hub. The housing includes at least one housing annular recess associated with an inner face of the housing. The housing annular recess contains an electrically conductive ring associated with the first connector. The hub includes at least one hub annular recess located on the inner face of the hub. The hub annular recess is complementary to a housing annular recess. The hub inner recess includes an electrically conductive ring associated with the second connector. At least one contact ring electrically unites the first electrically conductive ring and the second electrically conductive ring.

In another embodiment, the present invention provides a steering column interconnector comprising a housing and a hub rotatably associated with the housing to create a radial space. The interconnector includes an aperture passing through the hub and the housing, a first connector associated with the hub and a second connector associated with the housing. A plurality of hub annular recesses are associated with an inner face of the hub. Each hub annular recess includes a first electrically conductive ring. A plurality of housing annular recesses are associated with an inner face of the housing, and each housing annular recess includes a second electrically conductive metal ring. One or more circular spring contacts electrically unite complementary first electrically conductive rings with second electrically conductive rings.

In yet another embodiment, the present invention provides an automobile air bag assembly comprising a motion sensor, an air bag assembly associated with a steering wheel, and an interconnector of the present invention for providing an electrical path between the sensor and the air bag assembly.

Additional features and advantages of the present invention are described in, and will be apparent from, the detailed description of the presently preferred embodiments and from the drawings.

BRIEF DESCRIPTION OF THE DRAWINGS

There is shown in the drawings a presently preferred embodiment of the automobile steering column interconnector of the present invention wherein like numerals in the various Figures pertain to like elements.

DETAILED DESCRIPTION OF THE PRESENTLY PREFERRED EMBODIMENTS

Figure 1:
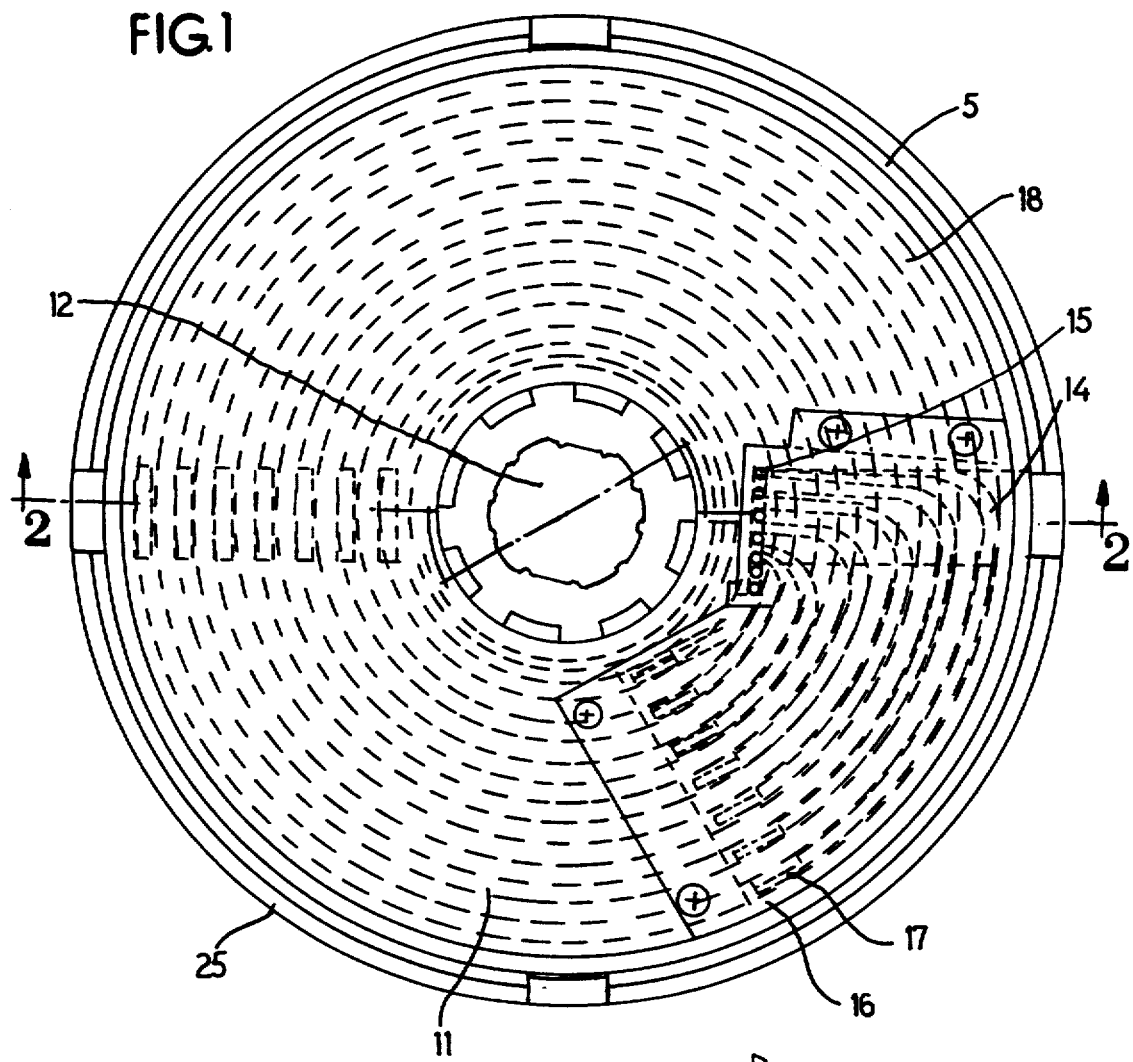
FIG. 1 illustrates a top view of a steering column interconnector of the present invention.

The present invention relates to a steering column interconnector that unites a sensor located in an automobile with a steering column located in a steering wheel of the automobile. The interconnector of the present invention is capable of having a plurality of circuits, and, therefore, the interconnector can also unite one or more stationary electrical apparatuses with an electrical switch, lamp, indicator, or like element located on the steering wheel.

A preferred embodiment of a steering column interconnector of this invention is shown in FIGS. 1-4. Referring to those figures, the steering column interconnector shown includes a hub 5 associated with a housing 10 to create a radial space 11 surrounding an aperture 12. The aperture 12 passes through the hub 5 and the housing 10. As in conventional clock spring interconnectors, the housing 10 is intended to remain stationary while the hub 5 is associated with the housing 10 so that it rotates in relation to the stationary housing 10.

The hub 5 and the housing 10 are made from an electrically insulating material, such as a plastic. All other nonelectrically conductive elements of the interconnector of the present invention are also made of an electrically insulating material. A preferred electrically insulating material is bakelite, a hard thermoset type plastic.

The hub 5 includes a first connector 14. The first connector 14 may include one or more terminals 15 for uniting the interconnector with electrical or electrically actuated devices located in the steering wheel.

The automobile steering column interconnector of the present invention is capable of providing a plurality of electrical connections between stationary sites in the automobile and the rotating steering wheel. Therefore, the first connector 14 may include the plurality of terminals 15 associated with, for example, a horn, cruise control, illumination devices on the steering wheel, radio controls, windshield wiper controls and/or lights. The number of terminals 15 associated with the first connector 14 will be limited only by the number of circuits that can be associated with the automobile steering column interconnector of the present invention.

The automobile steering column interconnector of the present invention includes a second connector 16 associated with the housing 10. The second connector 16 includes one or more terminals 17 for uniting various electrical devices, ground circuits, and sources of electrical power located in the automobile steering wheel interconnector. As with the first connector 14, the second connector 16 may include the plurality of terminals 17 for uniting apparatuses, such as windshield wipers, cruise control, automobile horn and the like, with corresponding electrical and mechanical elements located in the automobile body.

Figure 2:
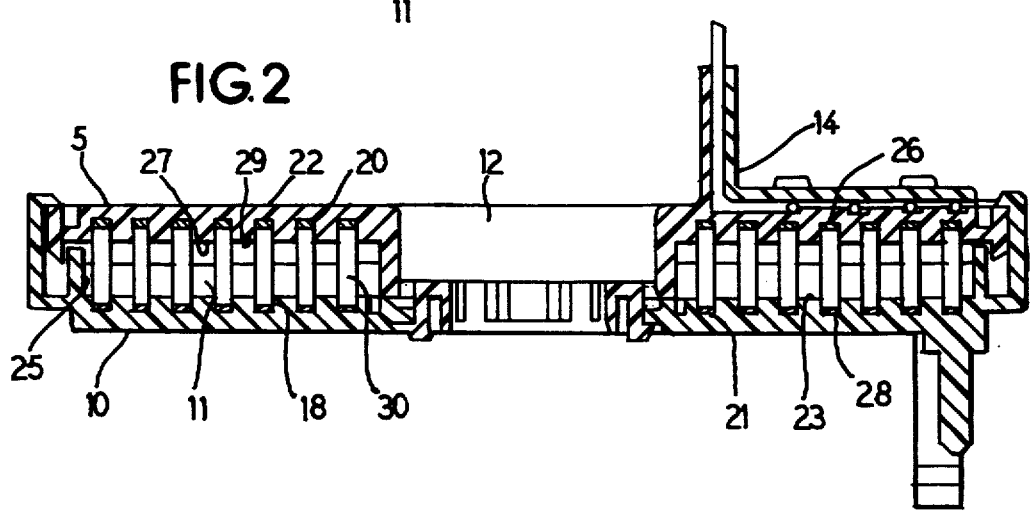
FIG. 2 illustrates a side view of a steering column interconnector of the present invention.
Figure 3:
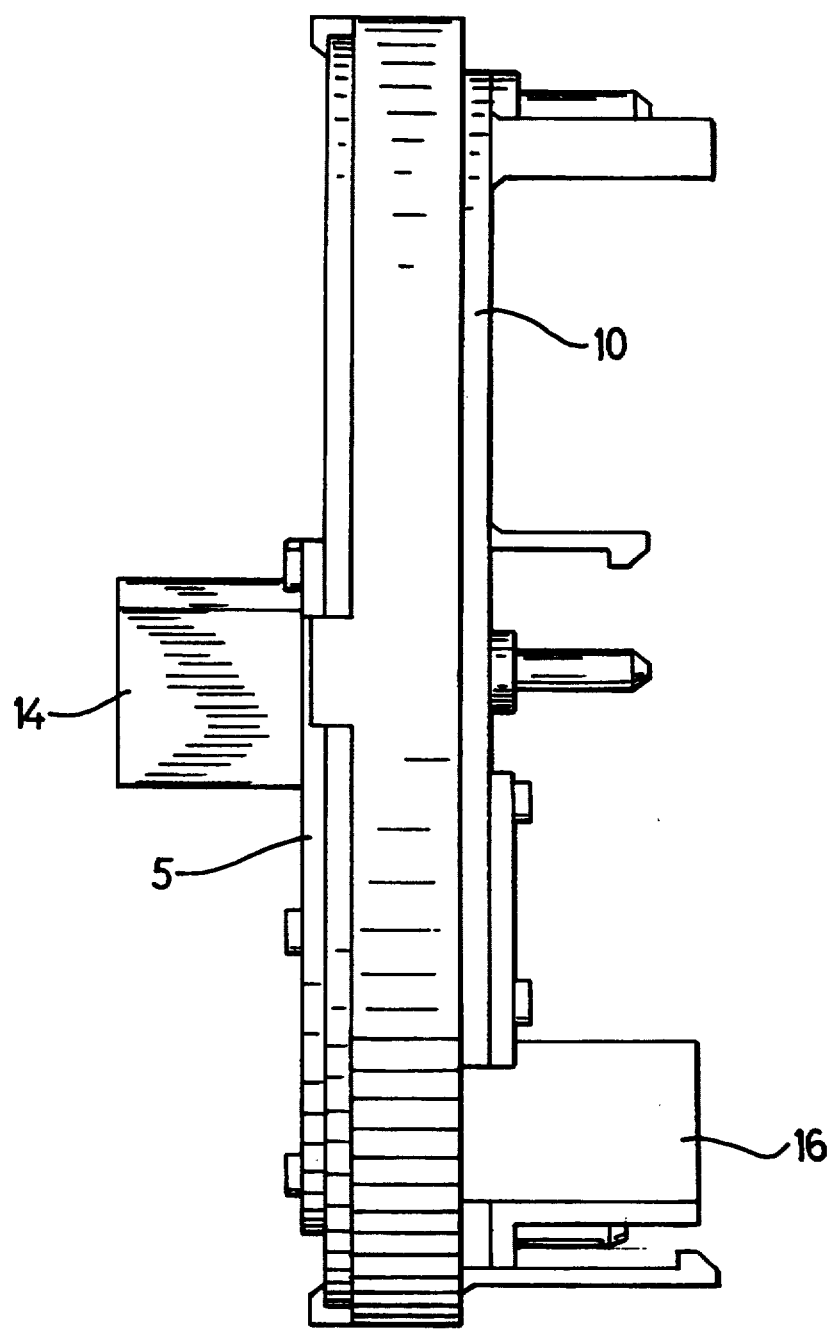
FIG. 3 illustrates a side cut-away view of a steering column interconnector of the present invention.
Figure 4:
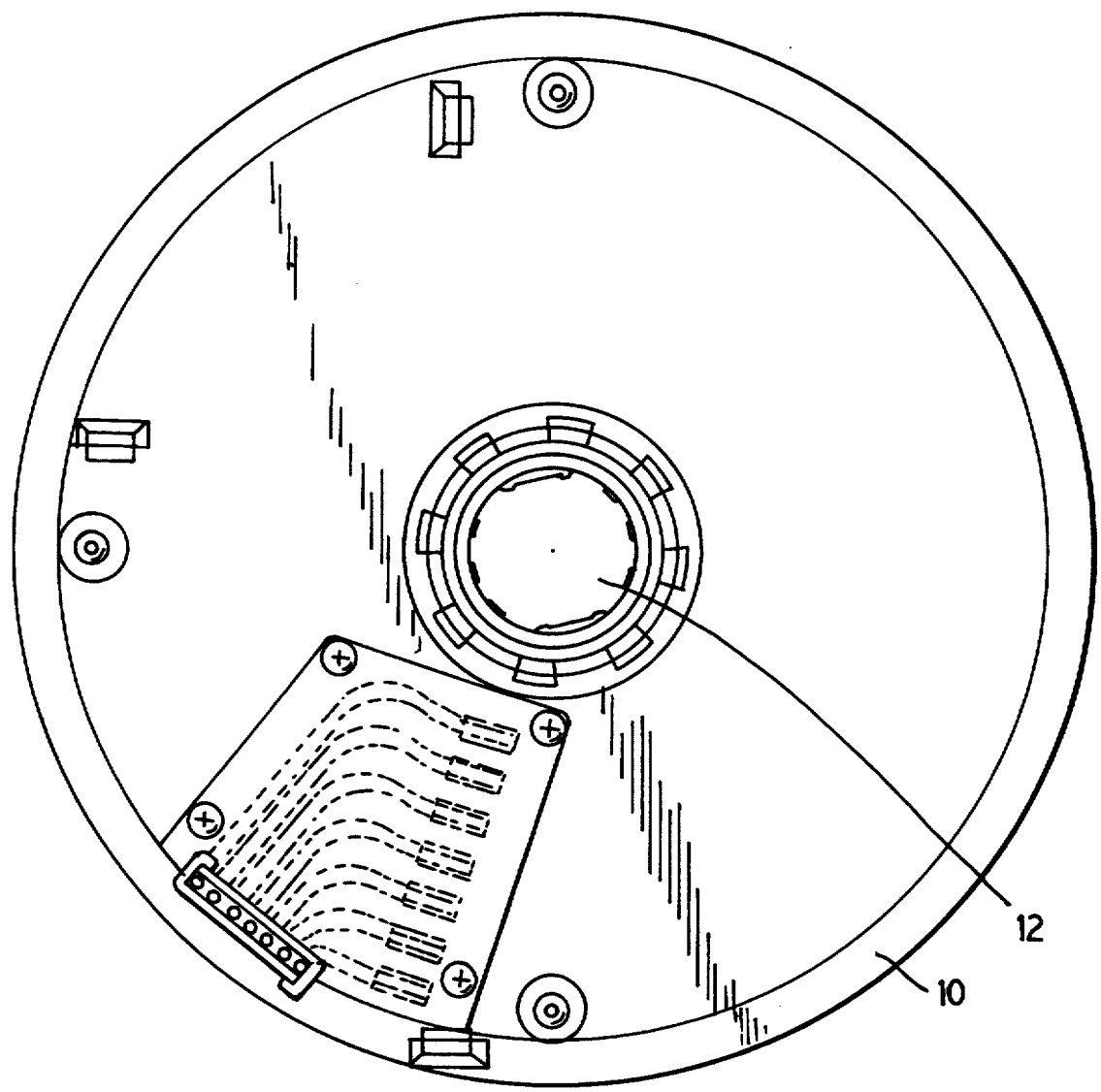
FIG. 4 illustrates a bottom view of a steering column interconnector of the present invention.

As shown in FIG. 2, the hub 5 includes an outer face 22 and an inner face 24. The inner face 24 of the hub 5 includes one or more hub annular recesses 20. The housing 10 also includes an outer face 21 and an inner face 23. The inner face 22 of the housing 10 includes one or more housing annular recesses 18. Each useful housing annular recess 18 has a complementary hub annular recess 20. That is, a useful hub annular recess 20 has a housing annular recess 18 located at the same distance from the axis of the interconnect and is perpendicularly connectable with a contact 30.

One or more of the hub annular recesses 20 must include a first electrically conductive ring 26. Likewise, one or more of the housing annular recesses 18 must include a second electrically conductive ring 28. At least one first electrically conductive ring 26 must be complementary to a second electrically conductive ring 28. Each first electrically conductive ring 26 is electrically united with the first connector 14 while each second electrically conductive ring 28 is electrically united with the second connector 16.

The first electrically conductive ring 26 and the second electrically conductive ring 28 are made of electrically conductive material. It is preferred that the electrically conductive rings 26, 28 are manufactured out of copper or a copper alloy. It is also preferred that the first electrically conductive ring 26 and the second electrically conductive ring 28 are flat. However, it is not necessary that the electrically conductive rings 26, 28 are flat, and they may be U-shaped, they may contain a plurality of bumps, or they may take on any texture or shape that is useful for maintaining a constant and reliable electrical path between the first electrically conductive ring 26 and a corresponding second electrically conductive ring 28. The electrically conductive rings 26 and 28 may also be constructed to relieve the stresses placed upon the contact 30 when it is located between the first and the second electrically conductive rings 26 and 28.

The first electrically conductive rings 26 and the second electrically rings 28 may generally be circular in shape and are sized to fit into the housing annular recess 18 and the hub annular recess 20, respectively. Alternatively, the housing annular recess 18 or the hub annular recess 20 may be associated with the hub 5 and the housing 10 after the first electrically conductive rings 26 and the second electrically conductive rings 28 have been associated with the inner faces 23 and 24, respectively.

One or more first electrically conductive rings and/or one or more second electrically conductive rings may not be totally electrically conductive. This can be accomplished by manufacturing a portion of the electrically conductive ring out of a non-electrically conductive material or, alternatively, coating a portion of the electrically conductive ring with a non-electrically conductive material. Such semi-electrically conductive rings are useful in situations which it is desired to have the rotation of the steering wheel intermittently activate or deactivate an electrical connection.

When the interconnector includes a plurality of the first electrically conductive rings 26 and the second electrically conductive rings 28, then they are located in a radial pattern beginning at about the aperture 12 radiating away from the aperture 12 towards an outer wall 25 of the steering column interconnector. In some instances, it will be desirable to electrically unite adjacent or nonadjacent first electrically conductive rings 26 or second electrically conductive rings 28. This can be accomplished by including an electrically conductive bridge 27 between two adjacent or non-adjacent electrically conductive rings 26 and 28.

Figure 5A:
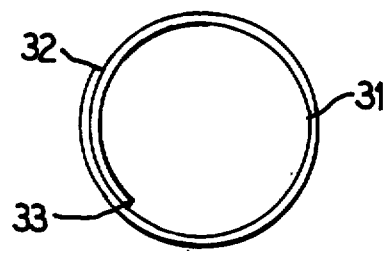
FIGS. 5A, 5B and 6A, 6B, and 7-9 are various embodiments of contacts useful in a steering column interconnector of the present invention.
Figure 5B:
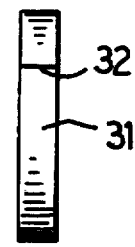

The electrical paths through the interconnector is completed in the present invention with one or more of the contacts 30. The contacts 30 may be any element or combinations of elements that are able to simultaneously rotate and conduct an electrical current or signal. A preferred contact circular spring 31 is shown in FIGS. 2, 5A and 5B. The preferred contact 30 is a single piece of electrically conductive material formed into a circular spring having a first end 32 and a second end 33 that overlap but that are not connected. The circular spring contact 31 shown in FIGS. 5A and 5B is slightly compressible allowing it to be located and slightly compressed between the first electrically conductive ring 26 and the hub annular recess 20 and the second electrically conductive ring 28 located in the housing annular recess 18. The compressibility of the circular spring contact 31 acts to relieve compression strain on the contact ring.

The contact 30 may taken on other shapes and forms. For example, the contact 30 may be a continuous metallic ring. A continuous metallic ring has been successfully used in the interconnector of the present invention. However, some continuous metallic rings are prone to stress failure due to material composition of the ring and stress factors, such as dimensions of the ring and/or loads thereon or the like. A continuous metallic ring contact made out of a resilient, electrically conductive material is, therefore, preferred. However, the cost of the material used to construct the continuous metallic contact ring might make the use of such a continuous metallic contact ring prohibitive.

Figure 6A:
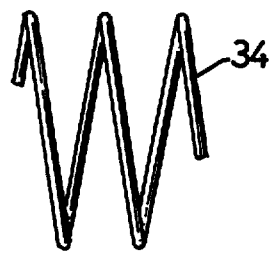
Figure 6B:
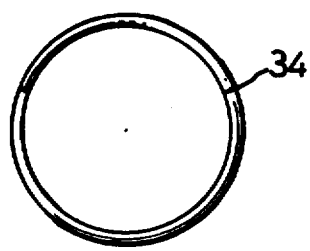

Other examples of the contacts 30 useful in the present invention are shown in FIGS. 6A, 6B, 7 and 8. FIGS. 6A and 6B show a lateral spring contact 34. The lateral spring contact 34 consists of a metal spring having two or more turns located between the housing annular recess 18 and the hub annular recess 20 so that its axis of rotation is parallel to the inner face 23 and the inner face 24. The lateral spring contact 34 is compressible and, therefore, provides the preferred strain relief properties of the contact 30.

Figure 7:
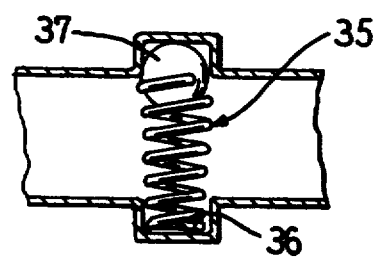

FIG. 7 is a ball/spring contact 35. The ball/spring contact 35 differs from the other contacts described because it is stationary. A spring 36 of the ball spring contact 35 shown contacts the first or the second electrically conductive ring 26 or 28. A ball 37 then contacts the opposite electrically conductive ring. The ball 37 is preferably located inside the spring 36. It is preferred that the spring 36 is tapered inwardly to provide a nest for the ball 37. Both the spring 36 and the ball 37 are made of an electrically conductive material. The spring 36 urges the ball 37 towards the electrically conductive ring 26 or 28 and also provides the preferred strain relief properties.

Figure 8:
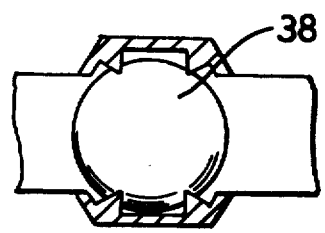

FIG. 8 shows a ball contact 38. The ball contact 38 is an electrically conductive ball that simultaneously contacts the first and the second electrical conducting rings 26 and 28. In this embodiment, as in other contact embodiments, strain relief can be incorporated into the electrical conductive rings 26 and 28 by making them V-shaped or spring shaped.

Figure 9:
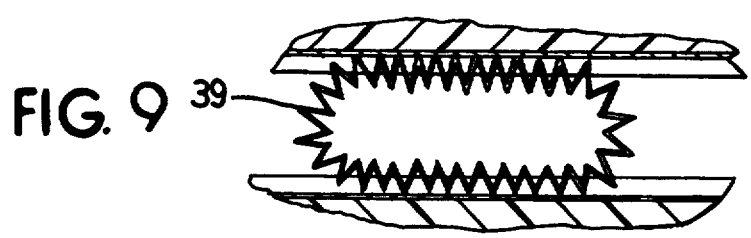

FIG. 9 illustrates a coil spring ring 39. The coil spring ring 39 acts as an electrical conductor between the first and the second electrical conducting rings 26 and 28. To this end, a coil spring is formed into a circular ring as shown in FIG. 9. The ring 39 is compressed between the conductive rings 26 and 28 of the interconnector.

The contacts described above are by no means the only contacts that are useful in the interconnector of the present invention. As described above, any contact that can provide a continuous electrical pathway between the first electrical conductive ring 26 and the second electrical conductive ring 28 can be used.

One or more of the contacts 30 may be associated with each of the electrically conductive rings 26 and 28. The contact 30 is necessary only to complete a desired circuit. Therefore, there may be instances where the first electrically conductive ring 26 is not united with a complementary second electrically conductive ring 28 by the contact 30. This situation might occur, for example, where an automobile does not include a feature that is intended to be operated by the particular electrically conductive path. Therefore, the clock spring interconnector of the present invention is inherently versatile in that the ultimate number of circuits comprising the steering column interconnector is dictated by the number of electrically conductive rings that are united by the contact 30.

As mentioned above, the contacts 30 are made of at least in part of electrically conductive material. It is preferred that the contacts 30 are made from copper or a copper alloy. It is also preferred that the contact 30 have a spring-like nature making the contact 30 slightly compressible. This feature of the contact 30 becomes important when the hub 5 is united with the housing 10. Slightly compressing the contact 30 between the first electrically conductive ring 26 and the second electrically conductive ring 28 insures that the contacts 30 are always being urged toward the electrically conductive rings 26, 28 thereby facilitating continuous and effective electrical connection between the hub 5 and the housing 10. Furthermore, compressing the contacts 30 keeps them from slipping out of the housing annular recess 18 and the hub annular recess 20.

One or more contact rings may be associated with each of the usable electrically conductive rings 26 and 28. It is preferred that at least two of the contacts 30 are associated with each of the electrically conductive rings 26 and 28. That way, if one contact 30 becomes oxidized or loses its electrical effectiveness, then a second contact 30 will be available to maintain the electrical path across the steering column interconnector.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A steering column interconnector comprising:
   a housing;
   a hub rotatably associated with the housing to create a radial space;
   an aperture passing through the hub and the housing;
   at least one hub annular recess associated with an inner face of the hub containing a first electrically conductive ring associated with a first connector;
   at least one housing annular access located on the inner face of the housing complementary to the at least one hub annular recess, the at least one housing annular recess including a second electrically conductive ring associated with a second connector and at least one coiled spring contact electrically uniting the first electrically conductive ring and the second electrically conductive ring, the at least one coiled spring contact capable of rotation between the hub and the housing due to relative rotation between said first and second rings.

2. The steering column interconnector of claim 1 wherein two or more said contacts electrically unite the first electrically conductive ring with the second electrically conductive ring.

3. The steering column interconnector of claim 1 wherein the first and the second electrically conductive rings are not coplanar.

4. The steering column interconnector of claim 1 wherein the contact is circular.

5. The steering column interconnector of claim 1 wherein one or more contacts electrically unite each of the plurality of first electrically conductive rings and second electrically conductive rings.

6. The steering column interconnector of claim 1 wherein an electrically conductive bridge unites two or more of said first electrically conductive rings.

7. The steering column interconnector of claim 1 wherein an electrically conductive bridge unites two or more of said second electrically conductive rings.

8. The steering column interconnector of claim 1 wherein the first connector and the second connector each include a plurality of terminals.

9. A steering column interconnector comprising:
a housing;
a hub rotatably associated with the housing to create a radial space;
an aperture passing through the hub and the housing;
a first connector associated with the hub;
a second connector associated with the housing;
a plurality of hub annular recesses associated with an inner face of the hub, each hub annular recess including a first electrically conductive ring;
a plurality of housing annular recesses associated with an inner face of the housing, each housing annular recess including a second electrically conductive metal ring; and
one or more coiled circular spring contacts electrically uniting complementary ones of said first electrically conductive rings with respective ones of said second electrically conductive rings wherein the one or more coiled circular spring contacts is capable of rotation between the housing and the hub due to relative rotation between said first and second rings.

10. An automobile air bag assembly comprising:
(a) a stationary motion sensor;
(b) an air bag associated with a rotatable steering wheel; and
(c) a steering column interconnector providing an electrical path between the motion sensor and the air bag assembly including a housing, a hub rotatably associated with the housing to create a radial space, an aperture passing through the hub and the housing, a first connector associated with the hub, a second connector associated with the housing, at least one hub annular recess associated with an inner face of the hub containing a first electrically conductive ring associated with the first connector, at least one housing annular recess located on the inner face of the housing complementary to a hub annular recess, the housing annular recess including a second electrically conductive ring associated with the second connector, and at least one coiled spring contact electrically uniting the first electrically conductive ring and the second electrically conductive ring wherein the at least one coiled spring contact is capable of rotating in the radial space between the housing and the hub due to relative rotation between said first and second rings.

* * * * *